(12) United States Patent
Schäfer et al.

(10) Patent No.: US 11,283,519 B2
(45) Date of Patent: Mar. 22, 2022

(54) SYSTEM AND METHOD FOR OPERATING A SYSTEM HAVING AT LEAST ONE FIRST MOBILE PART AND ONE SECOND MOBILE PART

(71) Applicant: SEW-EURODRIVE GMBH & CO. KG, Bruchsal (DE)

(72) Inventors: Thomas Schäfer, Karlsdorf-Neuthard (DE); Andreas Wanjek, Waghäusel (DE); Zhidong Hua, Bruchsal (DE)

(73) Assignee: SEW-EURODRIVE GMBH & CO. KG, Bruchsal (DE)

( * ) Notice: Subject to any disclaimer, the term of this patent is extended or adjusted under 35 U.S.C. 154(b) by 30 days.

(21) Appl. No.: 17/040,273

(22) PCT Filed: Mar. 6, 2019

(86) PCT No.: PCT/EP2019/025060
§ 371 (c)(1),
(2) Date: Sep. 22, 2020

(87) PCT Pub. No.: WO2019/179662
PCT Pub. Date: Sep. 26, 2019

(65) Prior Publication Data
US 2021/0021342 A1 Jan. 21, 2021

(30) Foreign Application Priority Data
Mar. 22, 2018 (DE) .......................... 102018002379.7

(51) Int. Cl.
*H04B 10/00* (2013.01)
*H04B 10/114* (2013.01)
*H04J 14/00* (2006.01)

(52) U.S. Cl.
CPC ..... *H04B 10/1149* (2013.01); *H04B 10/1143* (2013.01)

(58) Field of Classification Search
CPC ....................... H04B 10/1129; H04B 10/1149
See application file for complete search history.

(56) References Cited

U.S. PATENT DOCUMENTS

| 2015/0316924 A1 | 11/2015 | Oh et al. |
| 2019/0238227 A1* | 8/2019 | Bottari .................. H04W 24/08 |
| 2020/0177276 A1* | 6/2020 | Lakshmanan ........ H04B 1/3822 |

FOREIGN PATENT DOCUMENTS

| DE | 102011108579 A1 | 1/2013 |
| WO | 2008124713 A2 | 10/2008 |

OTHER PUBLICATIONS

International Search Report issued in International Application No. PCT/EP2019/025060, dated Jun. 25, 2019, pp. 1-2.

* cited by examiner

*Primary Examiner* — Daniel G Dobson
(74) *Attorney, Agent, or Firm* — Carter DeLuca & Farrell LLP

(57) ABSTRACT

A system includes a first mobile part and a second mobile part, each being able to be moved in a movement plane of an installation. The first mobile part has corner modules at its outer corner areas, and the second mobile part also has corner modules at its outer corner areas. Each corner module has an electronic circuit together with transmitters and receivers such that modulated light is able to be emitted with the aid of the transmitters, and modulated light is able to be detected and demodulated with the aid of the receivers. The receivers have different sensitivities for light from different directions in space, in particular, the receivers of the respective corner module being situated in one plane with respect to this respective corner module.

20 Claims, 3 Drawing Sheets

SYSTEM AND METHOD FOR OPERATING A SYSTEM HAVING AT LEAST ONE FIRST MOBILE PART AND ONE SECOND MOBILE PART

FIELD OF THE INVENTION

The present invention relates to a system and to a method for operating a system having at least one first mobile part and one second mobile part.

BACKGROUND INFORMATION

In certain conventional systems, mobile parts such as driverless transport systems, DTS, carry out logistical tasks in the intralogistics sector.

SUMMARY

Example embodiments of the present invention provide a system that may allow for a simple and economical communication to be established.

According to an example embodiment of the present invention, a system includes a first mobile part and a second mobile part, each being able to be moved in a movement plane of an installation. The first mobile part has corner modules at its outer corner areas, and the second mobile part also has corner modules at its outer corner areas. Each corner module has an electronic circuit together with transmitters and receivers. Modulated light is able to be emitted with the aid of the transmitters, and modulated light is able to be detected and demodulated with the aid of the receivers. The receivers have different sensitivities for light from different directions in space, in particular, the receivers of the respective corner module being situated in one plane with respect to this particular corner module.

This has the advantage that a simple and economical communication is able to be carried out insofar as only transmitters and receivers for light are required. Photosensitive semiconductors may be used as receivers and light-emitting illumination sources such as LEDs may be used as transmitters. These components are able to be used in a cost-effective manner and utilized for a high data transmission rate. By transmitting data from a corner module of a first mobile part to a corner module of a second mobile part and the subsequent forwarding of the data from the corner module of the second mobile part to a corner module of a third mobile part, data are thus able to be transmitted between the first and the third mobile part despite the fact that no line of sight exists between the first and the third mobile part. For example, even mobile parts that are located in an aisle of a high-rack warehouse are able to be supplied with data.

According to example embodiments, the transmitters of a respective corner module are situated and/or fitted on a circuit board, which is fastened to a cover part of the respective corner module. A mirror, fixed in place on the cover part of the respective corner module, deflects the light radiated by the transmitters, the circuit board in particular being aligned in parallel with the movement plane. The mirror, for example, having a subregion of a rotational solid whose rotational axis of symmetry is aligned in parallel with the normal direction of the circuit board plane and/or intersects the circuit board at a right angle. This offers the advantage that a circuit board is able to be placed in parallel with the cover part and the base plate in a space-saving manner and the light is easily deflectable with the aid of a mirror.

According to example embodiments, a first number of the corner modules of a respective mobile part is provided at the corners of an imaginary rectangle in a first plane that has a first ground clearance. This is considered advantageous insofar as a first communications plane is able to be provided in the installation.

According to example embodiments, the receivers of a respective corner module are accommodated in a boundary part, for example, in a respective recess of a boundary part of the respective corner module, such that the sensitive range of the respective receiver of a respective corner module covers an angular range of less than 60° in a plane parallel to the movement plane. This has the advantage that the receivers are accommodated such that they detect different directions in space to different degrees. When detecting a transmitter, one of the receivers having the greatest signal strength may thus be used so that a corresponding data transmission channel is able to be established. The other receivers may then be used for other data transmission channels, i.e., for a data transmission from other transmitters. As a result, groups may be created which are able to transmit data independently of one another at the same time using the same medium.

According to example embodiments, the sensitive range of the respective sensor, i.e., the sensitive total range of all receivers of a respective corner module, covers an angular range of more than 180° in a plane parallel to the movement plane. This offers the advantage that the largest possible angular range is able to be covered. For example, all-around monitoring is realizable by the overlap with the sensitive range of other corner modules.

According to example embodiments, the range able to be irradiated with light from the transmitters of the respective corner module covers an angular range of more than 180° in a plane parallel to the movement plane. This has the advantage that the largest possible angular range is able to be covered.

According to example embodiments, second corner modules of the respective mobile part are situated at the corners of an imaginary rectangle in a second plane, which has a second ground clearance that differs from the first ground clearance. This has the advantage that an additional communications plane is able to be established in the installation.

According to example embodiments, the respective corner module has a housing part, in particular, a plexiglass part, which is transparent to light. The housing part has a first planar region, followed by a curved region, which adjoins a second planar region, and the housing part is provided in one piece. A holding device is situated on a base plate of the respective corner module such that a camera is able to be fastened or is fastened to the holding device, the camera, for example, adapted to record images through the first or through the second region. This has the advantage that the plexiglass disk does not cause any distortion of the images. In addition, the installation of the camera is optional. That means that the corner modules are also operable without a camera. However, the holding device(s) are provided in any case. The holding device may include a threaded bushing part welded to the base plate or a screw nut part into which a retaining plate is able to be introduced by a screw, on which the camera is able to be mounted.

According to example embodiments, the mechanical interface has a drilling template and a centering collar, and/or the mechanical interface is defined by a drilling template, an electrical plug connection, and a centering collar. This offers the advantage that the corner modules are exchangeable. A respective corner module is therefore able to be exchanged for one of the others during servicing. All corner modules have the same configuration. As a result, only a single type of corner module must be stocked for the exchange.

According to example embodiments, the sensitive range of the respective sensor covers an angular range of more than 180° in a plane parallel to the movement plane. This offers the advantage that a corner module of a first mobile part is able to establish a communications link with a plurality of corner modules of another mobile part.

According to example embodiments, the range able to be irradiated by light from the transmitter covers an angular range of more than 180° in a plane parallel to the movement plane. This has the advantage that multiple corner modules of other mobile parts are able to be irradiated by light from the direction of a corner module of a mobile part. An MP2MP communication is therefore able to be established.

According to example embodiments, the corner modules of a respective mobile part are disposed at the corners of an imaginary rectangle. This has the advantage that the region of the movement plane surrounding the mobile part is able to be irradiated by at least two corner modules in each case, in particular, by the transmitters of at least two corner modules. In the same manner, light from one of the corner modules of the further mobile parts is able to be received by the receivers of at least two corner modules of the mobile part.

According to an example embodiment of a method for operating a system that includes a plurality of mobile parts, which are able to be moved on a movement surface, in particular, a movement plane, of an installation, the mobile parts including corner modules at the outer corner areas, each corner module having at least one transmitter for light and one receiver for light, a multipoint-to-multipoint communication, i.e., in particular, an MP2MP, is established between the corner modules of the mobile parts, the mobile parts, in particular, the corner modules of the mobile part, being users of a mesh network.

This has the advantage that a simple and economical communication is able to take place. More specifically, even a communication between two mobile parts between which no line of sight exists is able to be carried out, in which case interposed mobile parts function as a data forwarding line.

According to example embodiments, the data transmission within a first group of corner modules takes place simultaneously, in particular, in parallel, and independently of the data transmission within a second group of corner modules, both groups, in particular, using the same light and the same modulation frequency. This has the advantage that a higher data transmission rate is able to be achieved in the same channel using the same medium.

Further features and aspects of example embodiments of the present invention are described in more detail below with reference to the appended schematic Figures.

DETAILED DESCRIPTION

Mobile parts 1 and 2 are able to be moved on a movement plane of the installation. Each mobile part (1, 2) has a steering unit and an electromotoric drive so that the control is controlling the drive according to a driving order provided for the mobile part (1, 2).

The mobile parts 1 and 2 have the same configuration, for example.

Each mobile part 1 and 2 has at its four outer corners a corner module (3), which includes at least one transmitter in each case, which is able to emit light, and at least one receiver, which is able to detect light.

The angular range able to be irradiated by the transmitter encompasses an angular range of more than 180° in a plane parallel to the movement plane.

Because the corner modules are placed at the four outer corners and thus are positioned at a rotation of 90° or a whole number multiple of 90° in each case, the entire angular range around the respective mobile part (1, 2,) is covered, even in an overlapping manner.

Figure 1:
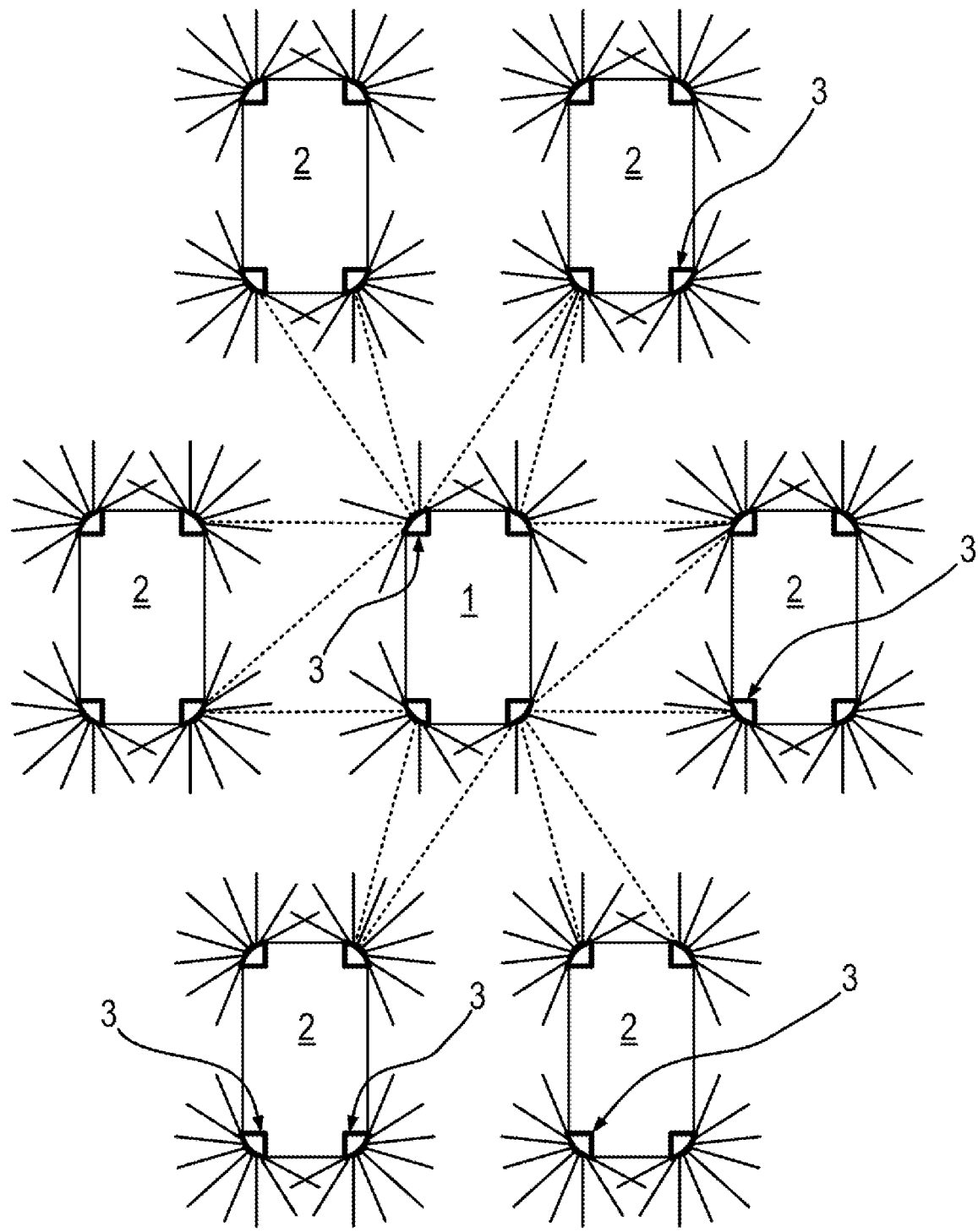
FIG. 1 schematically illustrates an installation according to an example embodiment of the present invention provided with mobile parts (1, 2) including corner modules.

In other words, an MP2MP communication is provided in this manner, i.e., a multipoint-to-multipoint communication. This is so because—as illustrated in FIG. 1—a communications link from a first corner module 3 of a first mobile part 1 to a plurality of corner modules 3 of one or more second mobile part(s) 2 is provided. In the same manner, a communications link is able to be established from a corner module of a second mobile part 2 to one or a plurality of corner module(s) 3 of first mobile part 1.

In other words, a data telegram is able to be transmitted from a first mobile part 1 to a second mobile part 2, which then transmits this data telegram to a further second mobile part 2. A respective mobile part (1, 2) may therefore be used as a transmitter.

Data telegrams are consequently able to be transmitted across a plurality of mobile parts 1, 2.

Data are thereby even transmittable around an obstacle if this obstacle prevents a direct beam of light. This is considered especially advantageous if a first mobile part 1 is located in an aisle of a high-rack warehouse and the further second mobile part 2 is located in another aisle of the high-rack warehouse. Thus, a second or a plurality of second mobile parts 2 may be used as transmitters so that the data telegrams are able to be conducted around a corner or multiple corners.

According to example embodiments of the present invention, light is used as the medium for the data transmission. In contrast to radio waves such as in the WLAN communication, a transmitter of a corner module does not reach all receivers of all corner modules although the distance of the mobile parts or corner modules is sufficiently short.

According to example embodiments of the present invention, groups of corner modules are therefore formed, which simultaneously transmit data within the respective group in the same medium independently of one another. A group is made up of two corner modules, for instance.

Figure 2:
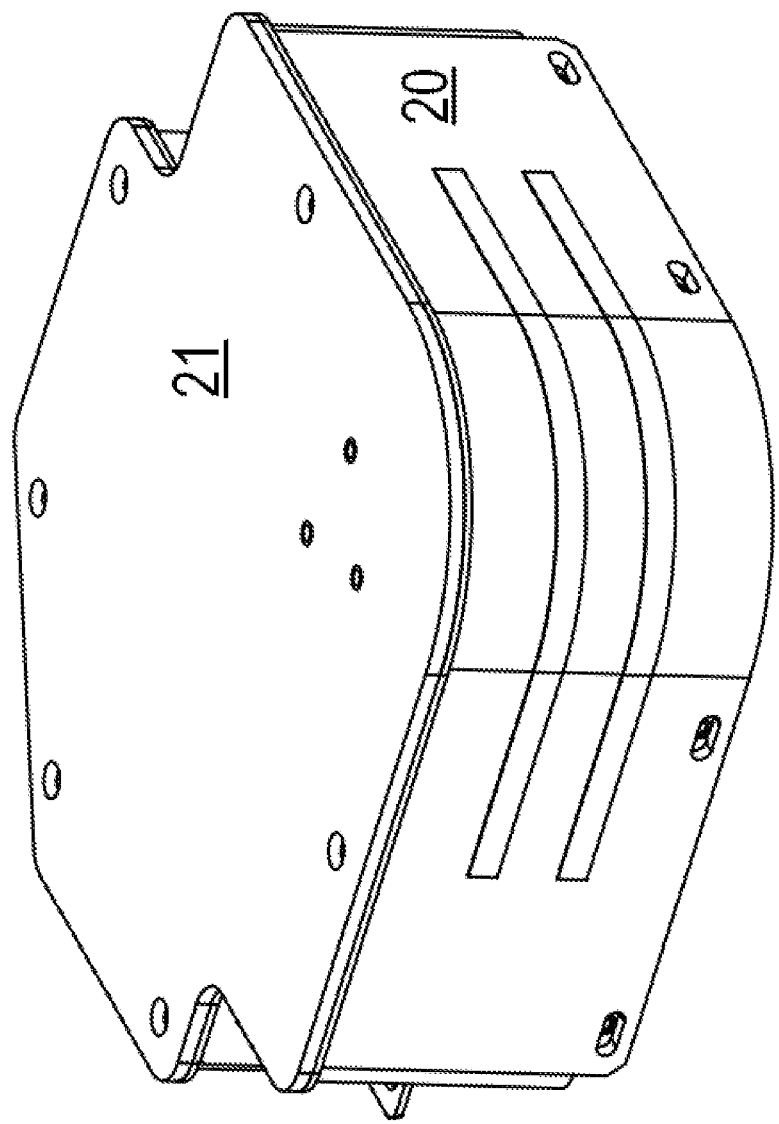
FIG. 2 is a perspective view of a corner module having a transparent housing part 20, in particular, a plexiglass part, and a cover part 21.
Figure 3:
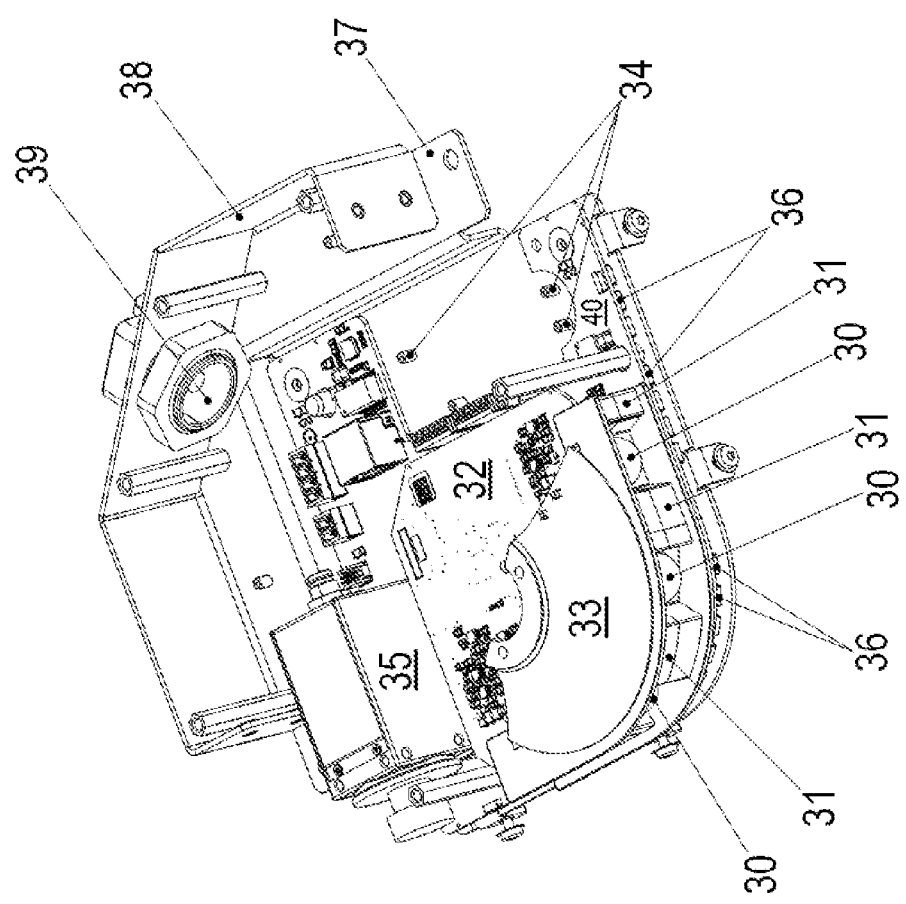
FIG. 3 is a perspective view of a corner module without the transparent housing part 20 and cover part 21 being shown.

As illustrated in FIGS. 2 and 3, a respective corner module has a plurality of receivers, especially four, whose sensitivities differ for different directions in space.

When establishing the data link, a transmitter thus initially sends a signal, and a corner module then determines the particular receiver that receives the strongest signal. A data transmission channel to the transmitter is established with the aid of this receiver. As a result, data are then transmittable in the same medium, at the same frequency, simultaneously and independently of one another within each of the groups, i.e., data transmission channels established in this manner. Each one of these groups may also be considered a network.

In particular, the corner modules of the groups are always situated at a shorter distance from one another than the maximum range of one of the transmitters defined in a single direction. In other words, if visual contact were to exist, a data transmission between all corner modules would be possible.

The corner modules are always attached to the mobile part (1, 2) in the same manner, i.e., with the aid of a defined mechanical interface. For this purpose, a drilling template may be provided in a plane that encompasses a respective corner surface of the mobile part (1, 2). For example, the mechanical interface also has a centering device such as a centering collar, etc., which is premolded on the respective corner surface of the mobile part (1, 2).

The always identical configuration of the mechanical interface in all corner areas of all modules (1, 2) makes all corner modules (3) interchangeable.

Each corner module (3) not only includes the mentioned transmitter and receiver, but also an electronic circuit, which is connected thereto and likewise fitted on a circuit board, in particular, together with the transmitter and receiver.

Each corner module (3) is connected to the mobile part with the aid of an electric plug connection so that the electronic circuit and the transmitter and receiver have an electrical supply, and a data bus for a data exchange between the control of the mobile part and the electronic circuit including the transmitter and receiver is able to be routed through the mechanical interface.

According to exemplary embodiments, first corner modules are situated in a first plane disposed in parallel with the movement plane. The ground clearance of these corner modules is therefore constant and has a first value. In the same manner, second corner modules are situated in a second plane in parallel with the movement plane. The ground clearance of these second corner modules is therefore constant and has a second value. In this manner, a data transmission in groups that are independent of one another is able to be carried out not only within the first plane but also within the second plane that is set apart therefrom.

A mobile part may have eight corner modules in each case because it is arranged substantially in the form of a rectangular parallelepiped.

As illustrated in FIG. 2, the corner module has a base plate on whose tab region 37 a side region 38 is formed. A supply line and a data line are also able to be provided in the side region.

Fastened to the base plate is a circuit board 40, which has illumination device(s) 36, in particular, LEDs, for a status display on its underside facing the base plate, i.e., between circuit board 40 and the base plate.

Disposed on a further circuit board 32, which is electrically connected to circuit board 40, are four receivers 30, in particular, phototransistors, which are separated from one another by a boundary part 31 for the accommodation of receivers 30 and are only able to detect a solid angle predefined by boundary part 31. As a result, receivers 30 have different sensitivities for different directions in space.

Housing part 20, in particular, a plexiglass part, which is transparent to light is arranged as one piece and has a first planar region followed by a curved region, which adjoins a further planar region.

A camera 35 is able to be placed in the interior space behind a respective planar region in each case, which makes it possible to ascertain the position of the mobile part through an image evaluation of the images recorded by cameras 35.

Holding device(s) 34 for the fastening of the respective camera 35 are provided on the base plate even if no camera 35 is mounted. However, holding device(s) 34 provide the option for fastening the camera.

Fixed in place on the inner side of cover part 21 is a third circuit board on which illumination device(s) such as LEDs are situated, which function as the transmitters of light for the data transmission, or in other words, provide the MP2MP communication. With the aid of a mirror 33 fastened to cover part 21, the light of the transmitters is deflected into the first plane, i.e., into a light beam or light cone substantially aligned approximately in parallel with the movement plane.

Mirror 33 is arranged as a subregion of a concave rotating solid.

According exemplary embodiments, a corner module or multiple corner modules (3) is/are also fixedly disposed in one or more position(s) in the installation. A data exchange with a central control is therefore possible as well, this central control of the installation being connected to the stationary corner module or corner modules for a data exchange.

LIST OF REFERENCE NUMERALS 1 mobile part
2 mobile part
3 corner module
20 transparent housing part, in particular, a plexiglass part
21 cover part
30 receiver, in particular, a phototransistor
31 boundary part for accommodating the receivers
32 circuit board
33 mirror
34 holding device
35 camera
36 illumination device, in particular, an LED for a status display
37 tab region of the base plate of the housing part
38 side wall
39 screwed cable connection

The invention claimed is:

1. A system, comprising:
a first mobile part; and
a second mobile part;
wherein each mobile part is movable in a movement plane of an installation;
wherein each mobile part includes corner modules at outer corner areas, each corner module including an electronic circuit, transmitters, receivers, the transmitters adapted to emit modulated light, the receivers adapted to detect and demodulate modulated light, the receivers having different sensitivities for light from different directions.

2. The system according to claim 1, wherein the corner module includes receivers arranged in a single plane.

3. The system according to claim 1, wherein the transmitters of a corner module are arranged and/or fitted on a circuit board is fastened to a cover part of the corner module, the corner module including a mirror, fixed in place on the cover part, adapted to deflect light emitted by the transmitters.

4. The system according to claim 3, wherein the circuit board is aligned in parallel with the movement plane.

5. The system according to claim 4, wherein the mirror includes a subregion of a rotational solid having a rotational axis of symmetry aligned in parallel with a normal direction of a circuit board plane and/or intersects the circuit board at a right angle.

6. The system according to claim 1, wherein a first number of corner modules of a mobile part is situated at corners of an imaginary rectangle in a first plane that has a first ground clearance.

7. The system according to claim 1, wherein an electromechanical interface is provided in each of the outer corner areas of a mobile part so that each corner module is exchangeable for another corner modules, the interface including a mechanical interface and an electrical plug connection.

8. The system according to claim 7, wherein the mechanical interface includes a drilling template and a centering collar and/or the mechanical interface is defined by a drilling template, an electrical plug connection, and a centering collar.

9. The system according to claim 1, wherein the receivers of a corner module are accommodated in a boundary part and/or in a recess of a boundary part of the corner module, such that a sensitivity range of the receiver covers an angular range of less than 60° in a plane parallel to the movement plane.

10. The system according to claim 1, wherein a sensitivity range of all receivers of a corner module covers an angular range of more than 180° in a plane parallel to the movement plane.

11. The system according to claim 1, wherein a range able to be irradiated with light from the transmitters of a corner module covers an angular range of more than 180° in a plane parallel to the movement plane.

12. The system according to claim 6, wherein second corner modules of a mobile part are situated at corners of an imaginary rectangle in a second plane having a second ground clearance that differs from the first ground clearance.

13. The system according to claim 1, wherein the corner module includes a housing part that is transparent to light, the housing part having a first planar region followed by a curved region that adjoins a second planar region, the housing part being arranged in one piece, a holding device being provided on a base plate of the corner module and adapted to fasten to a camera.

14. The system according to claim 13, wherein the housing part is arranged as a plexiglass part.

15. The system according to claim 13, wherein the camera is adapted to record images through the first planar region and/or the second planar region.

16. A method for operating a system that includes a plurality of mobile parts movable on a movement surface and/or in a movement plane of an installation, the mobile parts having corner modules at outer corner areas, each corner module having a light transmitter and a light receiver, comprising:
establishing a multipoint-to-multipoint and/or an MP2MP communication between the corner modules of the mobile parts.

17. The method according to claim 16, wherein the mobile parts and/or the corner modules of the mobile parts are arranged as users of a mesh network.

18. The method according to claim 16, wherein data transmission within a first group of corner modules takes place simultaneously and/or in parallel, and independently of data transmission within a second group of corner modules.

19. The method according to claim 18, wherein a same light and a same modulation frequency are used in the first group and the second group.

20. A method for operating a system as recited in claim 1, comprising:
establishing a multipoint-to-multipoint and/or an MP2MP communication between the corner modules of the mobile parts.

* * * * *